United States Patent [19]

Tsuda et al.

[11] 4,223,052
[45] Sep. 16, 1980

[54] SYNTHETIC RESIN MOLDING OR TRIM STRIP

[75] Inventors: Eiichi Tsuda, Nagoya; Tomihiko Mizudani, Anjo, both of Japan

[73] Assignee: Inoue Gomu Kogyo Kabushiki Kaisha, Nagoya, Japan

[21] Appl. No.: 931,312

[22] Filed: Aug. 7, 1978

[30] Foreign Application Priority Data

Aug. 5, 1977 [JP] Japan .................................. 52-93891

[51] Int. Cl.$^2$ ...................... B32B 15/08; B32B 27/36; B60R 13/04
[52] U.S. Cl. ...................................... 428/31; 156/332; 427/388.1; 427/435; 428/458; 428/482
[58] Field of Search ................. 428/31, 458, 480, 482; 156/332; 427/388 R, 435

[56] References Cited

U.S. PATENT DOCUMENTS

| | | | |
|---|---|---|---|
| 2,892,747 | 6/1959 | Dye | 428/458 |
| 2,961,365 | 11/1960 | Sroog | 428/458 X |
| 3,046,174 | 7/1962 | Brooks et al. | 428/31 X |
| 3,136,676 | 6/1964 | Fisch et al. | 156/244 |
| 3,249,485 | 5/1966 | Loew et al. | 428/122 |
| 3,440,129 | 4/1969 | Anselm | 428/31 X |
| 3,470,015 | 9/1969 | Shanok et al. | 427/409 |
| 3,480,462 | 11/1969 | Shanok et al. | 427/302 |
| 3,681,180 | 8/1972 | Kent | 428/31 X |
| 3,687,794 | 8/1972 | Shanok et al. | 428/31 |
| 3,881,042 | 4/1975 | Ungerer | 428/31 X |
| 3,956,559 | 5/1976 | Wildorf | 428/480 X |
| 4,133,924 | 1/1979 | Seino et al. | 428/458 X |

*Primary Examiner*—Harold Ansher
*Attorney, Agent, or Firm*—Armstrong, Nikaido, Marmelstein & Kubovcik

[57] ABSTRACT

A synthetic resin molding or trim strip prepared by adhering a metallic foil to the surface of a thermoplastic resin substrate or embedding said foil in said substrate by using an adhesive consisting of a transparent thermoplastic high molecular weight polyester copolymer.

5 Claims, 9 Drawing Figures

SYNTHETIC RESIN MOLDING OR TRIM STRIP

BACKGROUND OF THE INVENTION

This invention relates to synthetic resin molding or trim strips used for decorations, and more particularly, is directed to synthetic resin molding or trim strips which are used outdoors for the body side or window edgings of automobiles and which are prepared by adhering decorative foils such as aluminum foil and stainless steel foil to the surfaces of a substrate or by embedding said foils in said substrate by use of novel adhesives being different from conventional ones.

The prior art discloses the use of metallic edgings, such as stainless steel, on the roof and window edges or body sides or automobiles for decoration and protection. However, in order to decrease the total weight of the automobile, synthetic resin moldings have been used for the decoration. These moldings may be prepared by laminating metallic foils such as aluminum foil or decorative films such as polyester films, which have been prepared by vacuum-evaporating metals such as aluminum onto synthetic resins such as polyvinyl chloride, cellulose acetate butyrateresin and ABS resin (acrylonitrile butadiene styrene resin). Alternatively, said metallic foils or films may be embedded in said resins for unification. Various adhesives are employed in order to adhere the metallic foils or metal-evaporated synthetic resin films to said various synthetic resins. For example, there is provided the method of using lacquers such as cellulose nitrate, cellulose acetate and vinyl chloride-vinyl acetate copolymer in the disclosure of U.S. Pat. No. 3,136,676, the method of using adhesives such as polyvinyl chloride on metal-vacuum evaporated surfaces in U.S. Pat. No. 3,046,174, the method using acrylonitrile cement in U.S. Pat. No. 3,249,485, the method of hot-melt-coating the polymer consisting of anaerobic acrylate polyester monomers in U.S. Pat No. 3,470,015 and the method of using low molecular weight ester solutions in U.S. Pat. No. 3,480,462.

However, these adhesives have little durability in the adhesive properties when used for a long period of time, particularly outdoors, so that the metallic foils and resins become separated.

The present invention was attained to overcome the above disadvantages. Namely, one object of this invention is to provide synthetic resin molding or trim strips which can endure for a long time even when used outdoors. Another object of the invention is to provide synthetic resin molding or trim strips which fully keep the initial adhesive property when various bending treatments are carried out after the extrusion molding thereof.

As the result of various investigations, it has been found by the present inventors that the above objects can be attained by using a certain thermoplastic polyester resin as the adhesive for synthetic resin molding or trim strips.

The objects and characteristic features of this invention will be illustrated in detail by the following explanation referring to parts of the attached drawings. It is to be noted that the drawings are attached only for the explanation and do not limit the range of this invention.

DETAILED DESCRIPTION OF THE INVENTION

Figure 1:
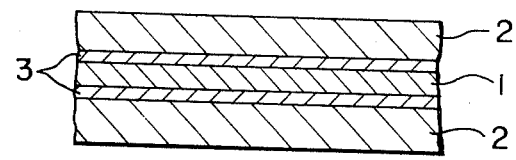
FIGS. 1 and 2 show the enlarged cross-sectional views of a part of a synthetic resin molding or trim strip given as an example of this invention.

As shown in FIG. 1, the inventive synthetic resin molding or trim strip is characterized by integrating a metallic foil 1 and a thermoplastics resin substrate 2 by use of an adhesive 3 of a transparent thermoplastic high molecular weight polyester copolymer, in a synthetic resin molding prepared by adhering said metallic foil 1 on the surface of said substrate 2 or embedding said foil 1 in said substrate.

Figure 2:
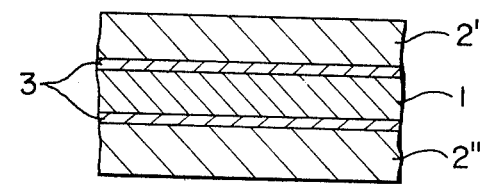

In this invention, there can be used any usual metallic foils, preferably, aluminum foil and stainless steel foil having a thickness of from 20–200$\mu$. As resins for forming a substrate, there are included transparent synthetic resins such as CAB (cellulose acetate butyrate) resin, polyvinyl chloride resin, and polycarbonate resin. As shown in FIG. 2, the upper part of the substrate divided by the metallic foil 1 is made of a transparent synthetic resin layer 2' and, if desired, the surface side thereof may be made of a thermoplastic resin layer 2" which is fully rigid, such as ABS (acrylonitrile butadiene styrene) resin, MBS (methyl-methacrylate butadiene styrene) resin, AAS (acrylonitrile butylacrylate styrene) resin, and AES (acrylonitrile ethylenepropylene rubber styrene) resin.

The adhesive used in this invention is prefereably a linear saturated polyester copolymer comprising (1) a dibasic acid consisting of 90% or more by mol of an aromatic dibasic acid and an aliphatic dicarboxylic acid for the remainder as a dibasic acid component, and (2) a glycol consisting of diethylene glycol and an alkylene glycol having 6 or less carbon atoms as a glycol component.

As for said polyester copolymer, it is to be noted that a copolymer that contains an aromatic dibasic acid of 90% or more by mol of terephthalic acid and a glycol of 40% or more by mol of diethylene glycol is desirable, particularly, with respect to the balance of flexibility and rigidity.

As other aromatic dibasic acids, there can also be used at least one of phthalic acid and isophthalic acid, and as aliphatic dicarboxylic acids, at least one of adipic acid and sebacic acid. Also, as alkylene glycols having 6 or less carbon atoms, there can be used ethylene glycol, 1,2-propylene glycol and neopentyl glycol.

In order to increase the plasticity of the inventive polyester copolymer, 1–2% of a trifunctional compound such as glycerine and pentaerythritol may be added as a third component of said copolymer.

These components are polymerized for the preparation of the polyester copolymer by employing known processes such as the direct esterification of terephthalic acid and glycol and the transesterification of dimethyl phthalate and glycol to obtain a colorless or pale blue linear high molecular weight polyester copolymer of specific gravity of about 1.2, molecular weight of about 20,000 and melting point in the range of 140°–160° C. This polyester copolymer is soluble in various organic solvents such as methyl ethyl ketone (MEK), ethyl acetate, dioxane, toluene, benzene, xylene, methylene chloride, triclene and tetrahydrofuran or the mixed solution of two or more thereof.

Figure 3:
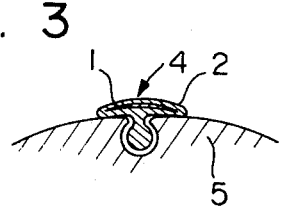
FIGS. 3, 4 and 5 show the cross-sectional views showing the states of assembly of the inventive synthetic resin molding or trim strip.
Figure 4:
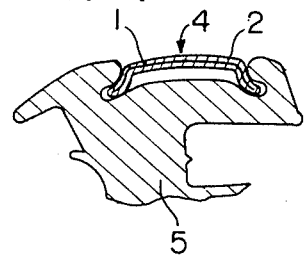
Figure 5:
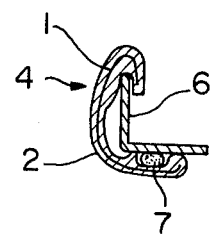

FIGS. 3, 4 and 5 are cross-sectional views of examples of the inventive synthetic resin molding or trim strips. FIG. 3 shows an example of using the molding for window edgings of an automobile. In the figure, 4 indicates the synthetic resin molding put in a rubber layer 5, wherein a metallic foil 1 having a coating of the inventive adhesive on the surfaces thereof is embedded in the synthetic resin substrate 2 of said molding.

FIG. 4 shows an example of putting both ends of the inventive synthetic resin molding 4 in the rubber layer 5. FIG. 5 shows an example of assembling the inventive synthetic resin molding 4 by putting the molding 4 in the upper end of an automobile roof edge 6 and adhering the lower end thereof with a butyl rubber body 7.

Figure 6:
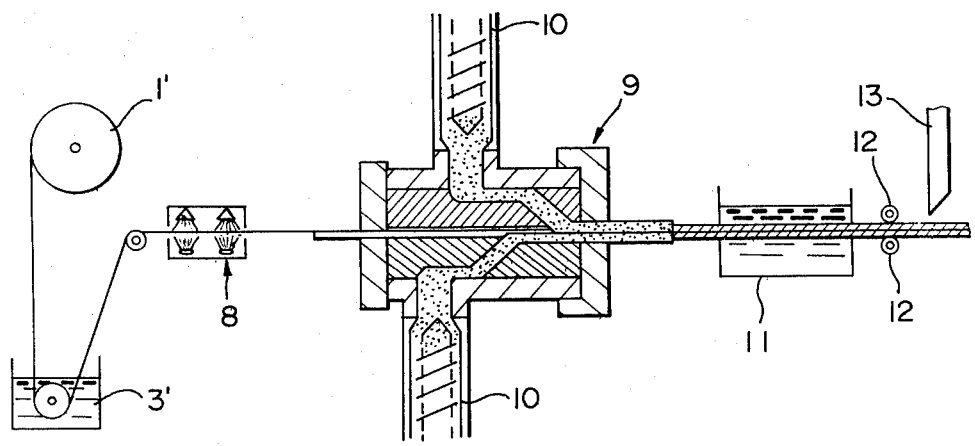
FIG. 6 shows the view of a process of manufacturing the inventive synthetic resin molding or trim strip.

The following is an explanation as to the process for producing the inventive synthetic resin moldings. In FIG. 6, 1' indicates a roll of metallic foil and 3' indicates a solution of an adhesive consisting of said polyester copolymer dissolved in organic solvents such as ethyl acetate and toluene, wherein a concentration of 20–30% by weight is usually desirable; 8 indicates an oven wherein infrared rays are applied; 9 indicates a die (cross delivery head type) set up at the top of the extruder 10, 10. The figure shows an example of coating both surfaces of a metallic foil with different types of resins, for example, applying CAB resin on the upper surface of the finished product and ABS resin on the under surface; 11 indicates a cooling tank containing cooling water; 12, 12 indicates a receiving roll; 13 indicates a cutting device for cutting fixed lengths. In such apparatus, a roll of metallic foil 1 is passed through the adhesive solution 3 to have the surfaces coated with an adhesive, put into an oven 8 to completely evaporate and delete the solvent, and introduced into the die. Then, one or both surfaces or the metallic foil are coated with a fused synthetic resin to form the resin substrate 2 which is shaped by use of the die, passed through the cooling tank and cut into fixed lengths to obtain the synthetic resin molding.

The invention is explained by the following example.

The inventive synthetic resin molding was tested as to weather-resistance, etc. First, the polyester copolymer (molecular weight about 20,000) obtained by polymerizing terephthalic acid (95%), isophthalic acid (2%) and adipic acid (3%) as the acid component and diethylene glycol (50%), propylene glycol (20%) and neopentyl glycol (30%) as the glycol component was dissolved in toluene, and the solution was applied to one surface of an aluminum foil to a thickness of 80μ and dried (the applied amount of resin being about 4 g/m²). The surface coated with the solution was coated with a CAB resin extruded at a temperature of about 200° C. to a thickness of about 500μ to prepare a test piece of the inventive molding. Next, in a similar way, a conventional adhesive, vinyl chloride-vinyl acetate copolymer, was applied to an aluminum foil to a thickness of 80μ at a rate of about 4 g/m², and the resulting surface was coated with a CAB resin extruded under the same conditions as above to prepare a test piece of the molding for a comparative test.

Figure 7:
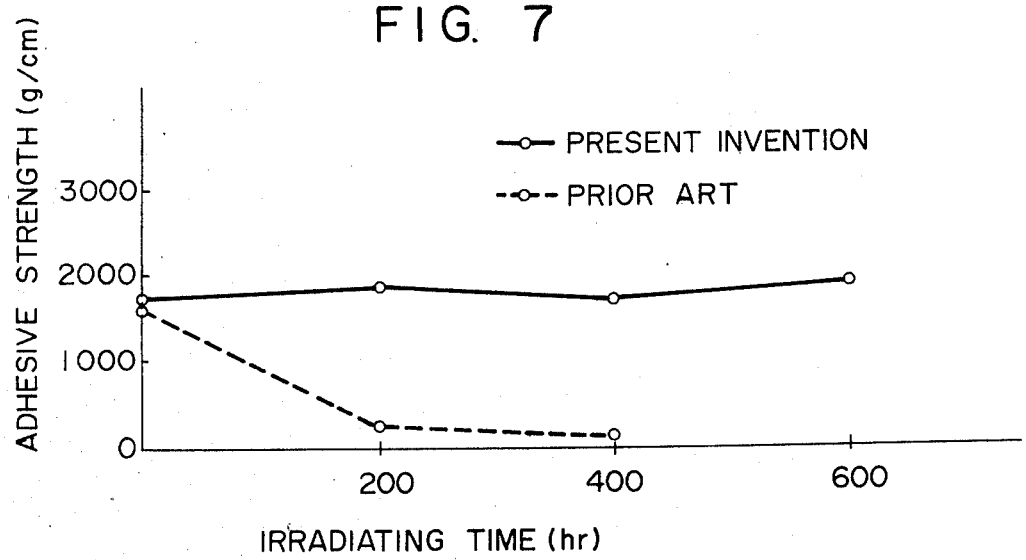
FIGS. 7, 8 and 9 provide graphs showing the weather-resistance of the inventive synthetic resin molding or trim strip, the thermal resistance (heat-aging at 90° C.) and the water-resisting property (dipping in water at 70° C.), respectively.
Figure 8:
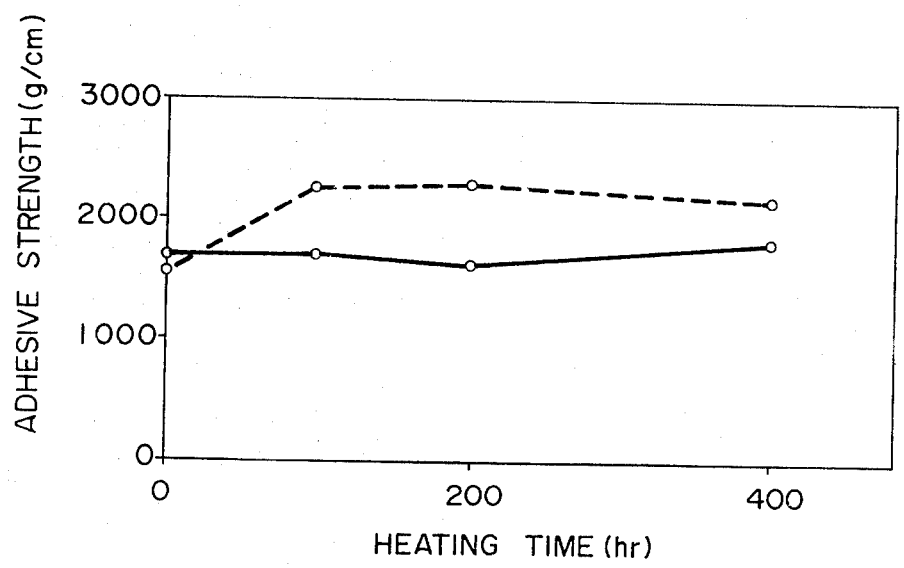
Figure 9:
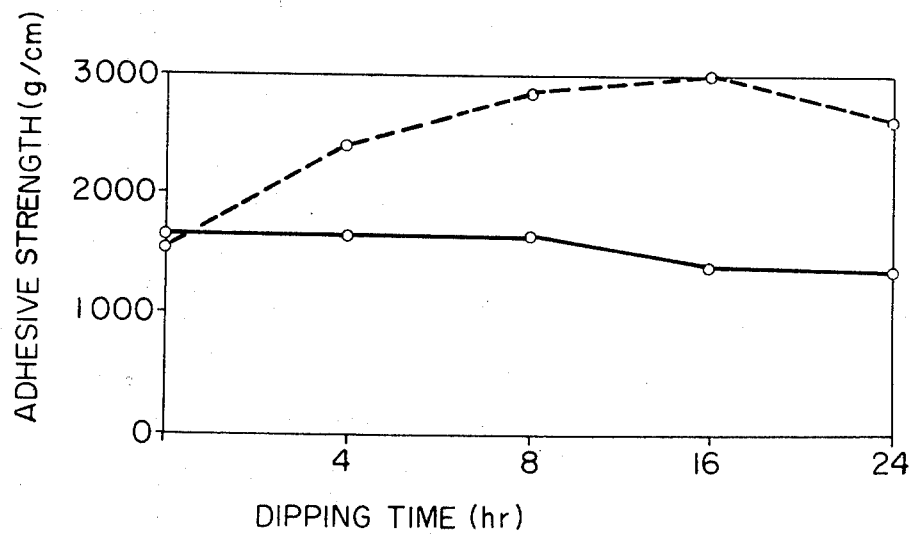

The thus obtained molding pieces were tested for durability of the adhesives and the results are shown in the graphs of FIGS. 7, 8 and 9.

FIG. 7 is a graph showing the peeling strength of the adhesive after a promoted aging test was carried out by use of a weatherometer. The strength was determined by measuring the power needed to peel off the aluminum foil from the adhered CAB resin layer in the opposite direction at 180° to the CAB resin layer adhered thereto at a rate of 200 mm/min by holding the portion of aluminum foil to which adhesive is not applied. It is clear from the graph that, when a conventional adhesive of vinyl chloride-vinyl acetate copolymer was used, the adhesive property thereof was reduced to a great extent after 200 hours (200 hours by the weatherometer using a carbon arc corresponds to one year of outdoor exposure), while the adhesive property of the inventive polyester copolymer resin used as the adhesive was retained even after 600 hours (about 3 years).

As obvious from the graph of FIG. 8, lowering of the adhesive property of this invention was little recognized even after the aging test of continuous heating at 90° C. which corresponds to the outdoor temperature of an automobile roof in summer.

As clear from the graph of FIG. 9, when the inventive polyester copolymer resin was used as the adhesive, it was recognized that the peeling strength was slightly reduced only after the dipping test in water at 70° C. Accordingly, it can be said that the adhesives of this invention would have no disadvantage, even when the moldings are used for the outer decoration of automobiles, etc.

As mentioned in the above, the inventive moldings prepared by using the polyester adhesives having excellent weather-resistance and good water-resisting properties can endure for a long time when used outdoors, so that they are quite suitable for use as edgings for automobile roofs, etc. In addition, the inventive moldings using thermoplastic adhesives are practically useful, because the metallic foil and the coated resin are never separated when any bending treatments are given to the moldings used for roof and window edgings according to their shapes.

What is claimed is:

1. In a synthetic resin molding or trim strip prepared by adhering a metallic foil on, or embedding said foil in, the surface of a thermoplastic resin substrate, the synthetic resin molding or trim strip characterized in that the metallic foil and the resin substrate layer are integrally bonded by an adhesive of a transparent thermoplastic linear saturated polyester copolymer consisting of at least the following components:
   (a) dibasic acids consisting of aromatic dibasic acids comprising 90 mol% or more and aliphatic dicarboxylic acids comprising the remainder of the dibasic acid components, 90 mol% or more of said aromatic dibasic acids being terephthalic acid; and
   (b) glycols consisting of diethylene glycol and alkylene glycols having 6 or less carbon atoms, said diethylene glycol being 40 mol% or more of said glycols.

2. The synthetic resin molding described in claim 1 wherein the aromatic dibasic acids are selected from the group consisting of terephthalic acid, phthalic acid, isophthalic acid, and mixtures thereof.

3. The synthetic resin molding described in claim 1 wherein the aliphatic dicarboxylic acids are selected from the group consisting of adipic acid, sebacic acid, and mixtures thereof.

4. The synthetic resin molding described in claim 1 wherein the alkylene glycols are selected from the group consisting of ethylene glycol, 1,2-propylene glycol, neopentyl glycol and mixtures thereof.

5. In a weather-resistant synthetic resin molding or trim strip prepared by adhering a metallic foil on, or embedding said foil in, by means of thermal melting or extrusion-molding, the surface of a transparent thermoplastic resin substrate, wherein the synthetic resin molding or trim strip is characterized in that the metallic foil and the resin substrate layer are integrally bonded by an adhesive of a transparent thermoplastic linear saturated polyester copolymer consisting of at least the following components:
  (a) dibasic acids consisting of aromatic acids selected from the group consisting of terephthalic acid, which constitutes at least 90 mol percent of said aromatic dibasic acids, phthalic acid, isophthalic acid, and mixtures thereof, and aliphatic dicarboxylic acids selected from the group consisting of adipic acid, sebacic acid and mixtures thereof; and
  (b) glycols consisting of diethylene glycol constituting at least 40 mol percent of said gylcols, and alkylene glycols selected from the group consisting of ethylene glycol, 1-2-propylene glycol, neopentyl glycol and mixtures thereof; and
  (c) a trifunctional compound.

* * * * *